Figure 4:
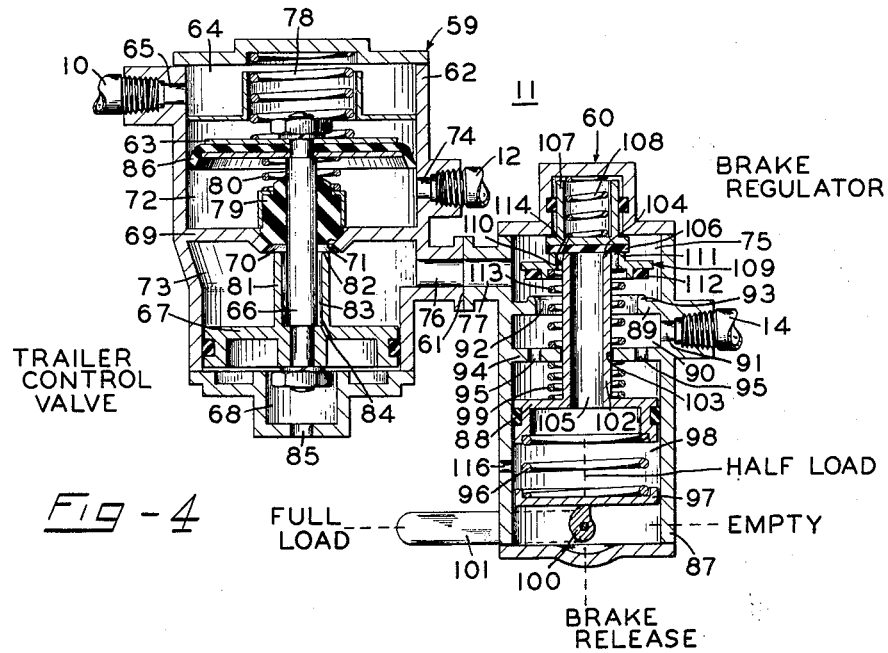

Dec. 11, 1962   E. PEKRUL   3,068,050
TRACTOR-TRAILER AIR BRAKE APPARATUS
Filed Feb. 9, 1961   2 Sheets-Sheet 1
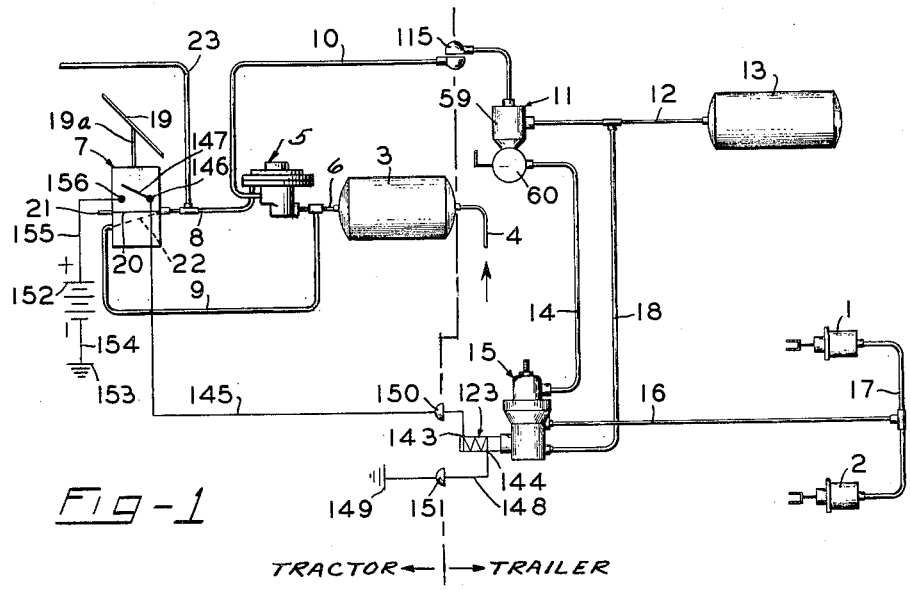
INVENTOR.
EWALD PEKRUL
BY
*C. O. Steinmiller*
ATTORNEY Dec. 11, 1962 E. PEKRUL 3,068,050
TRACTOR-TRAILER AIR BRAKE APPARATUS
Filed Feb. 9, 1961 2 Sheets-Sheet 2

PRESSURE LIMITING VALVE

INVENTOR.
EWALD PEKRUL
BY
A. A. Steinmiller
ATTORNEY

United States Patent Office 3,068,050
Patented Dec. 11, 1962

3,068,050
TRACTOR-TRAILER AIR BRAKE APPARATUS
Ewald Pekrul, Hannover, Germany, assignor to Westinghouse-Bremsen-Gesellschaft, m.b.H., Hannover, Germany
Filed Feb. 9, 1961, Ser. No. 88,042
Claims priority, application Germany Feb. 19, 1960
10 Claims. (Cl. 303—8)

This invention relates to tractor-trailer fluid pressure operated brake apparatus for highway type vehicles and, more particularly, to such apparatus characterized by means for ensuring against lag, with respect to both time and magnitude, of brake application on the trailer portion of the vehicle relative to brake application on the tractor portion of the vehicle.

It is a well-known principle that for any given occurrence of braking operation of a tractor-trailer vehicle, the braking effect on the trailer portion of the vehicle should occur either slightly ahead of or at least concurrently with the braking effect on the tractor portion of the vehicle in order to prevent possible jackknifing of the tractor-trailer. Tractor-trailer vehicles may be presently equipped with brake apparatus having independently operable controls whereby the operator of the vehicle may actuate the trailer brakes ahead of the tractor brakes. This type of apparatus is not completely foolproof since effective braking operation depends upon the operator's memory to initiate trailer brakes ahead of tractor brakes. Other tractor-trailer brake apparatus presently in use may provide for application of the trailer brakes automatically and concurrently with application of the tractor brakes but the magnitude of the trailer application may be less than that of the tractor application, which is also an undesirable condition that may cause jackknifing.

Accordingly, the object of the present invention is to provide a tractor-trailer brake apparatus for highway type vehicles having means automatically operable for insuring trailer brake application slightly ahead of and of magnitude at least equal to tractor brake application for any occurrence of a brake application on the tractor-trailer vehicle. Essentially, the invention comprises a fluid pressure operable trailer brake portion of the vehicle brake apparatus operatively connected to a tractor brake portion of the vehicle brake apparatus whereby initiation of a brake application on the vehicle automatically effects a comparatively light application of the trailer brakes slightly ahead of the application of the brakes on the tractor portion of the vehicle. Concurrently with actuation of the tractor brakes, the trailer brakes are fully actuated in accordance with the degree of application effected on the tractor. According to the invention, a pressure limiting valve device is associated with the trailer portion of the vehicle brake apparatus and has associated therewith a magnet valve device which is electrically energized automatically upon initial movement of a foot pedal of a manually operable graduating brake valve by the operator for actuating the vehicle brakes. Energization of the magnet valve device is set to occur slightly ahead of the application of the vehicle brakes so as to effect operation of the limiting valve device to provide the trailer portion of the vehicle with a light braking force ahead of brake application on the tractor. Upon completion of movement of the foot pedal by the operator to the desired degree, full braking action takes effect on the entire vehicle, the limiting valve device now operating to increase the braking force on the trailer portion by an amount equivalent to that applied on the tractor portion, thereby assuring adequate and timely braking effect on the trailer portion of the vehicle. If the tractor-trailer vehicle is equipped with an engine brake controlled by a manually operable device for effecting a comparatively light retarding action during downgrade running, for example, the magnet valve device of the pressure limiting device is electrically connected to said manually operable device. Upon actuation of the engine brake, which effects a uniform braking action for any operation thereof, by the manually operable control device, the magnet valve device of the limiting valve device is concurrently energized to effect a light brake application of the trailer brakes concurrently with the brake application effected on the tractor portion of the vehicle by the engine brake.

Figure 5:
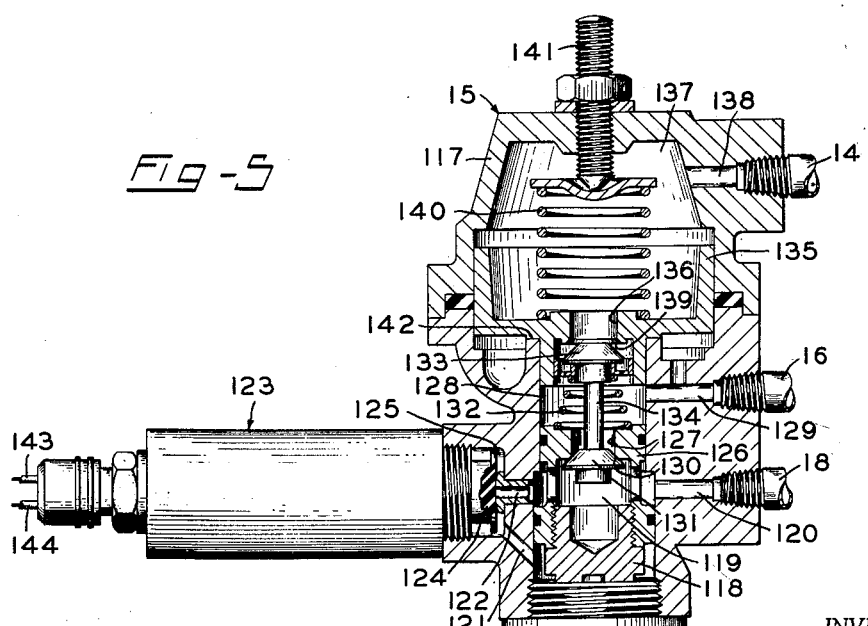

In the drawings, FIG. 1 is a schematic arrangement of a tractor-trailer vehicle brake apparatus embodying the invention; FIG. 2 is a fractional schematic arrangement of a modification of the apparatus shown in FIG. 1; FIG. 3 is an elevational view on an enlarged scale of a trailer brake valve device employed in the apparatus shown in FIG. 1; FIG. 4 is an elevational view on an enlarged scale of trailer control valve device employed in the apparatus shown in FIG. 1; and FIG. 5 is an elevational view on an enlarged scale of a pressure limiting valve device employed in the apparatus shown in FIG. 1.

DECRIPTION, FIGS. 1, 3, 4 AND 5

As schematically shown in FIG. 1 of the drawings, the brake apparatus for a tractor-trailer vehicle embodying the invention comprises two brake cylinder devices 1 and 2 for two respective wheel-axle units (not shown) of the trailer portion of the vehicle, a main reservoir 3 charged with fluid under pressure via a conduit 4 by a compressor (not shown) for operating the tractor-trailer vehicle brakes and a trailer brake valve device 5 connected to said main reservoir via a conduit 6 and to a manually operable valve device 7 via a conduit 8, said manually operable valve device being also connected to said main reservoir via a branch conduit 9 connected to said conduit 6. The trailer brake valve device 5 is also connected via a conduit 10 to a trailer control valve device 11, the latter being connected by a conduit 12 to an auxiliary reservoir 13, charged with fluid under pressure from main reservoir 3 in a manner to be hereinafter explained and by a conduit 14 to a pressure limiting valve device 15, the latter being connected to the brake cylinder devices 1 and 2 via a conduit 16 and a branch conduit 17. The pressure limiting valve device 15 is also connected to the auxiliary reservoir 13 via a branch conduit 18 connected to conduit 12.

Since it is not considered essential to an understanding of the invention herein disclosed, the manually operable valve device 7 (FIG. 1) by which the operator of the vehicle controls application and release of both the tractor and trailer brakes of the vehicle is shown in outline only and preferably is of the graduating type for effecting delivery of fluid at a pressure corresponding to the amount of depression executed on a foot pedal 19 of said manually operable valve device by the operator of the vehicle. In a release position of the foot pedal 19 a brake release communication 20 (represented by a solid line in the drawing) is established for effecting release of the brakes on the vehicle by way of a vent 21. Though not shown in the drawing, the valve device 7 includes therein a graduating valve which effects delivery of fluid at a pressure corresponding to the amount of depression of the foot pedal 19 and, therefore, the amount of movement of a plunger 19a operable by said foot pedal for operating the graduating valve upon establishment of delivered fluid pressure to the desired degree, the graduating valve operates, in well-known manner, to a lapping position to maintain delivered fluid pressure at the desired degree. When said foot pedal is depressed to a brake application position, a fluid pressure supply communication 22 (represented by a broken line in the drawing) is established for connecting conduit 9 to conduit 8 and, therefore, to a conduit 23 leading to brake cylinders (not shown) for applying wheel brakes (not shown) on the tractor portion of the vehicle. Since the valve device 7 is of the graduating type, as above noted, the degree of braking corresponds to the amount of depression of foot pedal 19. At the same time that fluid under pressure is delivered to conduit 23, fluid at the same pressure is delivered via conduit 8 to a control chamber 24 of the trailer brake valve device 5 (FIG. 3), to be immediately described, via a connection 25 in said trailer brake valve device.

The trailer brake valve device 5, which is characterized by self-lapping action (see FIG. 3), comprises a casing 26 having operably disposed therein a diaphragm type piston 27 subjected on the lower side thereof, as viewed in the drawing, to pressure of fluid obtaining in chamber 24 and subjected on the upper side to atmospheric pressure obtaining in an atmospheric chamber 28 formed cooperatively by said diaphragm and said chamber. A tubular valve seat member 29 is coaxially supported by the piston 27 for axial movement therewith. The valve seat member 29 is provided with an extension member extending coaxially therefrom and exteriorly of casing 26 through an axially aligned bore 30 formed in the upper extremity of said casing, as viewed in the drawing, one end of said extension member having formed thereon a collar 31 larger than said bore for engaging the casing 26 and thereby defining respective supply positions of the valve seat member and of the piston, while the other end is provided with a pair of diametrally arranged lugs engaged in respective diametrally arranged slots 35 formed in the adjacent end of member 29. The slots 35 are large enough to permit a certain amount of lost motion action between the member 29 and the extension member. A spring 32 disposed in atmospheric chamber 28 and acting on piston 27 and, therefore, on valve seat member 29 biases said piston and said valve seat member toward their respective supply positions, as will be presently described. A spring 33 encircles the extension member of valve seat member 29 between the upper end of casing 26 and the lugs on said extension member, said spring being in a relaxed state when said valve seat member is in its supply position. Valve seat member 29 has a passageway 34 extending coaxially therethrough opening at one end by way of slots 35, into chamber 28 and encircled at the other end by an annular valve seat 36 on which an exhaust valve 37 is adapted to be seated (when said valve seat member and piston 27 are in their respective supply positions) by biasing action of a spring 38 disposed in a fluid pressure delivery chamber 39 formed in casing 26 and connected to conduit 10 by a connection 40 formed in said casing.

Exhaust valve 37 is coaxially and rigidly connected by a stem 41 to a supply valve 42 disposed in a fluid pressure inlet chamber 43 into which conduit 6 opens via a connection 44 formed in casing 26. A valve seat member 45 is biased in a fixed position relative to supply valve 42 in pressure inlet chamber 43 by a spring 46, said supply valve 42 occupying an unseated position relative to said valve seat member when piston 27 and valve seat member 29 are in their respective supply positions in which communication is established between conduit 6 and conduit 10 via inlet chamber 43, through an opening 47 extending through valve seat member 45 and through delivery chamber 39. When fluid at a pressure sufficient for overcoming the opposing forces of spring 32 and of spring 33, upon take-up of lost motion in slots 35, is supplied to control chamber 24, in the manner above noted, piston 27 and valve seat member 29 are moved in an upwardly direction, as viewed in the drawing, toward respective exhaust positions with exhaust valve 37 and supply valve 42 following due to the action of spring 38. Upon a certain amount of movement of piston 27 and valve seat member 29 toward their respective exhaust positions, supply valve 42 is first caused to move to a seated position on an annular valve seat 48 encircling opening 47 in valve seat member 45, thereby preventing further movement of both said supply valve and the exhaust valve 37 and thereby cutting off communication between conduits 6 and 10.

Upon seating of supply valve 42 on valve seat 48 and upon remaining movement of piston 27 and valve seat member 29 to their exhaust positions, said valve seat member 29 moves away from exhaust valve 37 so that said exhaust valve occupies an unseated position relative to valve seat 36 whereby delivery chamber 39 and conduit 10 are vented to atmosphere (for a purpose to be hereinafter mentioned) past exhaust valve 37 and via passageway 34, atmospheric chamber 28 and a vent port 49 formed in casing 26, the extent of said venting being determined by the degree of fluid pressure introduced into chamber 24 as determined by valve device 7.

The self-lapping action of the trailer brake valve device 5 is provided by a control piston 50 operably disposed in a central chamber 51 in casing 26, said control piston having a concentric bored hub 52 through which valve seat member 29 extends for relative axial movement therebetween. The hub 52 of piston 50 is axially slidable in sealed relationship within a coaxial bore 53 formed in a transversely disposed separating wall 54 in casing 26. Respective sealing rings 55 and 56 are provided between bore 53 and the external surface of hub 52 and between the internal surface of said hub and the external surface of valve seat member 29. The lower portion, as viewed in the drawing, of central chamber 51 is connected by a restricted or choked passage 57 to delivery chamber 39 so that the adjacent or lower side of piston 50 is subjected to delivery chamber pressure while the upper side of said piston is subjected to fluid pressure prevailing in inlet chamber 43 by way of an unrestricted passageway 58 connecting said inlet chamber to the upper portion of said central chamber. Thus, when supply valve 42 is in its unseated position, fluid under pressure in delivery chamber 39 flows through restricted passageway 57 to act on the lower side of control piston 50, said lower side having an effective pressure area greater than the effective pressure area of the upper side by an amount equivalent to the cross-sectional area of hub 52. The differential force established between the two pressure areas causes said control piston to be moved upwardly to a normal position determined by abutment of said control piston with the wall 54. This upwardly acting force which causes the control piston 50 to move to its normal position is also effective on valve seat member 29 to an extent determined by the friction between sealing ring 56 and said valve seat member. Therefore, upward movement of control piston 50 causes a certain amount of upward movement of piston 27 and a corresponding amount of compression of spring 32, said amount of movement not being sufficient for operating piston 27 and valve seat member 29 to their respective exhaust positions, but being absorbed in the slots 35.

When delivery chamber 39 is vented as a result of introduction of fluid pressure into chamber 24, as above described and as a result of which piston 27 and valve seat member 29 have been operated to their exhaust positions, the lower portion of central chamber 51 and, therefore, the adjacent side of control piston 50 are relieved of fluid pressure, whereby the force of pressure acting on the upper side of said piston prevails to move said piston downwardly, as viewed in the drawing, to a cut-off position. This downward movement of control piston 50 thereby relieves piston 27 and valve member 29 of the upwardly acting forces thereon to the extent of that imposed thereon by said control piston when in its normal position above defined. This reduction of upwardly acting forces is sufficient to permit spring 32 to cause downward movement of piston 27 and valve seat member 29 sufficiently to restore valve seat 36 into seated position on exhaust valve 37 to cut off further venting of delivery chamber 39 and conduit 10, but not to unseat supply valve 42.

The trailer control valve device 11 (see FIG. 4) comprises a control portion 59 and a pressure regulator portion 60, said portions being joined at 61 by suitable means not shown and being useable independently of each other in other brake systems if so desired. The pressure regulator portion 60, which will be described hereinafter in greater detail, permits regulating brake pressure in accordance with the amount of the load on the trailer portion of the vehicle.

The control portion 59 of the trailer control valve device 11 is characterized by self-lapping action and comprises a casing 62 which cooperates with a piston 63 therein to form a control chamber 64 at the upper end of said control portion, as viewed in the drawing, said control chamber being connected to conduit 10 via a connection 65 formed in said casing. A piston stem 66 having one end coaxially fixed to piston 63 has a second piston 67 coaxially fixed at its opposite end, said two pistons thereby being movable as a unit, the said second piston cooperating with casing 62 to form an atmospheric chamber 68 at the end of said casing opposite control chamber 64. A separating wall 69 formed in casing 62 intermediate pistons 63 and 67 is provided with a central opening 70 surrounded by a valve seat 71 and through which piston stem 66 is axially movable. Separating wall 69 cooperates with casing 62 and with pistons 63 and 67 to form, respectively, a pressure chamber 72 and a transfer chamber 73, the former being connected to conduit 12 via a connection 74 formed in said casing while the latter is connected to a pressure inlet chamber 75 in the regulator portion 60 via respective connections 76 and 77 formed in the control portion 59 and said regulator portion and communicating at the joint 61.

A spring 78 disposed in control chamber 64 biases piston 63 toward an exhaust position in which a supply-exhaust valve 79 slidably and coaxially carried on piston stem 66 in sealing relation thereto in pressure chamber 72 occupies a seated position on valve seat 71 toward which seated position said supply-exhaust valve is biased by a spring 80 surrounding said piston stem and compressed between piston 63 and said supply-exhaust valve in said pressure chamber. A valve seat member 81 formed integrally with piston 67 in coaxially surrounding relation to piston stem 66 in transfer chamber 73 and having an annular valve seat 82 formed at one end adjacent the supply-exhaust valve 79 occupies an unseated position relative to said supply-exhaust valve when piston 63 and, therefore, piston 67 are in exhaust position, above described. In the unseated position of valve seat member 81, transfer chamber 73 is vented to atmosphere past valve seat 82, via a clearance 83 provided between piston stem 66 and said valve seat member through a passageway 84 formed in piston 67 communicating clearance 83 with atmospheric chamber 68 and an atmospheric port 85 formed in casing 62.

Piston 63 is provided with a packing-cup type check valve 86 which permits flow of fluid under pressure between its outer periphery and the inner surface of casing 62 from control chamber 64 to pressure chamber 72 but prevents flow in an opposite direction for a purpose to be hereinafter explained.

In response to preponderance of fluid pressure in pressure chamber 72 acting on the adjacent side of piston 63 over the combined opposing forces of spring 78 and pressure of fluid acting on the opposite side of said piston in control chamber 64, pistons 63 and 67 are moved upwardly, as viewed in the drawing, out of their exhaust positions to respective supply positions in which valve seat 82 first moves to a seated position on supply-exhaust valve 79 to cut off atmospheric venting of transfer chamber 73 and then moves said supply-exhaust valve to a position unseated from valve seat 71 to place transfer chamber 73 in communication with pressure chamber 72 via opening 70. Fluid under pressure from auxiliary reservoir 13 may then flow from pressure chamber 72 to transfer chamber 73 whence it flows to the regulator portion 60, said flow being controlled by the lapping action of the control portion 59 as will be presently described.

When build-up of fluid pressure in transfer chamber 73 and, therefore, acting on the adjacent side of piston 67, combined with the forces exerted by spring 78 and the remaining fluid pressure in control chamber 64, is sufficient for overcoming the force exerted by pressure of fluid acting on the side of piston 63 adjacent pressure chamber 72, said piston 67 and, therefore, piston 63 are moved downwardly to a lap position in which supply-exhaust valve 79 is reseated on valve seat 71 to cut off further flow of fluid under pressure from auxiliary reservoir 13 to regulator portion 60, while valve seat 82 remains seated on said supply-exhaust valve. If fluid pressure in transfer chamber 73 is reduced in any manner such as by leakage, for example, to a degree at which fluid pressure in pressure chamber 72 again exceeds the combined resistance of fluid pressure acting on piston 67, fluid pressure acting on the upper side of piston 63 and spring 78, piston 63 moves upwardly to unseat supply-exhaust valve 79 from valve seat 71 to allow pressure of fluid delivered to regulator portion 60 to be restored to the original delivered pressure as determined by the degree of fluid pressure reduction in control chamber 64. By this self-lapping action of control portion 59, pressure of fluid delivered to regulator portion 60 is maintained within a controlled range.

The regulator portion 60 of the trailer control valve device 11 comprises a casing 87 having the pressure inlet chamber 75 at one end thereof and a piston 88 axially operable in the other end of said casing. A separating wall 89 formed in casing 87 intermediate its ends serves to define the pressure inlet chamber 75 from a fluid pressure delivery chamber 90 which is connected to conduit 14 via a connection 91 formed in said casing. Separating wall 89 is provided with a central opening 92 surrounded by an annular valve seat 93. A spring seat 94 in the form of a transverse wall formed internally of and integrally with casing 87 is disposed between piston 88 and separating wall 89 and is provided with a plurality of openings 95 to permit fluid pressure communication from delivery chamber 90 to the adjacent side of piston 88. Piston 88 is biased upwardly, as viewed in the drawing, by a spring 96 compressed between said piston and a spring seat 97, said spring and spring seat both being located in an atmospheric chamber 98 formed in casing 87 at the end opposite inlet chamber 75. A relatively light spring 99 acting on piston 88 in opposition to spring 96 is compressed between said piston and spring seat 95 primarily for preventing jerky motion or undesirable vibration of said piston. The respective compressions of springs 96 and 99 may be varied or adjusted by a cam 100 engaging with spring seat 97, said cam being manually operable by being operatively connected to a handle 101 situated externally of casing 87.

The handle 101 which is operable to one of three braking positions that may be designated as "Full Load," "Half Load" and "Empty," as shown in the drawing, is set to the position most closely conforming to the load condition of the vehicle whereby a degree of brake application corresponding as nearly as possible to the amount of the load is effected when the trailer brakes are applied. The handle 101 also has a fourth position which may be designated as a "Brake Release" position for releasing the trailer brakes when the trailer is uncoupled from the tractor, as will hereinafter be described.

Piston 88 has coaxially extending from the side adjacent delivery chamber 90 at tubular valve seat member 102 extending through a central opening 103 formed in spring seat 94 and through the central opening 92 in separating wall 89 to terminate at one end with an annular valve seat 104 in the pressure inlet chamber 75, said annular valve seat surrounding at said one end a passageway 105 which extends through said tubular valve seat member and opens to the side of piston 88 adjacent atmospheric chamber 98.

A disc type pilot valve 106 is carried by a cylindrical support member 107 slidably operable in a recess formed in casing 87 in the end adjacent inlet chamber 75 in axial alignment with valve seat member 102, said pilot valve being biased toward a seated position on valve seat 104 of said valve seat member by a spring 108 caged in said cylindrical support member. An annular valve member 109 disposed in inlet chamber 75 in surrounding relation to valve seat member 102 is provided with a central opening 110 encircled at one end by an annular valve seat 111 adapted to seat on pilot valve 106 and encircled at the opposite end by an annular valve 112 adapted to seat on valve seat 93. A spring 113 compressed between spring seat 94 and valve member 109 acts to bias valve seat 111 toward a seated position on pilot valve 106 and to bias valve 112 to a position unseated from valve seat 93.

The regulator portion 60 of the trailer control valve device 11 functions solely for controlling the braking force applied to the trailer in accordance with the load condition of the trailer and, therefore, could be eliminated completely from the braking system without interrupting braking operations of the system, the only difference being the elimination of the regulating function of said regulator portion 60. Because of its functional characteristic as related to the remainder of the braking system, the manner of operation of the regulator portion 60 will be presently described and further reference to said description of operation thereof will not be made when the operation of the brake system in general is described hereinafter unless it is deemed necessary to a clear understanding of the invention.

In considering the manner of operation of the regulator portion 60 of the trailer control valve device 11, it should be understood that supply and release of fluid under pressure to and from, respectively, said regulator portion is accomplished in a manner to be hereinafter noted by way of connection 77 opening into inlet chamber 75 while delivery of fluid under pressure from said regulator portion is accomplished via connection 91 to conduit 14. With the handle 101 positioned for the full load condition of the trailer portion of the vehicle, that is, set to "Full Load" position, cam 100 places spring 96 under maximum compression for effecting corresponding braking forces on the trailer wheels. When the compression of spring 96 is set by positioning of handle 101, spring 108 is also compressed due to the rigid connection between said two springs provided by the tubular valve seat member 102 and pilot valve 106. Compression of spring 108, however, ceases upon abutment of a shoulder formed on cylindrical member 107 with a shoulder formed on casing 87 and surrounding the recess in which said cylindrical member encaging said spring is disposed, whereupon further and complete compression of spring 96 is accomplished corresponding to the position setting of handle 101. With handle 101 in any one of its three braking positions, spring 108 is always under much greater compression than spring 113, the latter needing to be compressed only enough to maintain valve member 109 seated against valve 106.

It will be assumed that all parts of the regulator portion 60 are in the respective positions shown in the drawing when fluid under pressure is admitted into inlet chamber 75. Fluid under pressure flows from inlet chamber 75 through opening 92 in separating wall 89 and around the tubular valve seat member 102 to conduit 14 via delivery chamber 90 and connection 91. Fluid under pressure may flow through a passageway 114 extending transversely through pilot valve 106 to keep the pressure acting on both sides thereof equalized with the exception of the area on the lower side enclosed by valve seat 104. Fluid under pressure also flows through openings 95 to act on the upper side of piston 88 until such pressure acting thereon builds up sufficiently to cause piston 88 to move downwardly, as viewed in the drawing, against the opposing force of spring 96.

With downward movement of piston 88 and, therefore, of tubular valve seat member 102, spring 108, which is always under greater compression than spring 113 causes pilot valve 106 and, therefore, valve member 109 to move downwardly with piston 88, such downward movement continuing until valve 112 seats on valve seat 93 at which point further flow of fluid under pressure from inlet chamber 75 to delivery chamber 90 is cut off whereupon further build-up of fluid pressure acting on the upper side of piston 88 is also cut off and its downward movement terminated. As long as the pressure of fluid acting on the upper side of piston 88 remains unchanged from the value at which valve 112 seated on valve seat 93, that is, the degree of pressure at which said fluid was delivered to conduit 14 in accordance with the setting of handle 101, all the parts remain in a balanced state with pilot valve 106 seated on seat 109 and valve 112 seated on seat 93.

If, however, the pressure of fluid acting on the upper side of piston 88 should drop due to some reason such as leakage, for example, sufficiently to render spring 96 effective for moving piston 88 upwardly against the combined forces of spring 99, spring 108 and the differential pressure of fluid acting on pilot valve 106, said pilot valve is momentarily unseated from seat 111 by the tubular valve seat member 102 whereupon fluid under pressure from inlet chamber 75 may first immediately flow past the unseated pilot valve to become effective on the lower side of valve 112 and thereby cause the latter to be unseated from valve seat 93. With unseating of valve 112 pilot valve 106 immediately reseats and pressure of fluid in delivery chamber 90, conduit 14 and on the upper side of piston 88 again builds up until downward movement of said piston permits reseating of valve 112 on valve seat 93 to restore a balance of fluid presure. By providing the pilot valve 106, a smaller increment of pressure loss on the delivery side triggers the action immediately above described to restore the desired degree of pressure in conduit 14, which degree is determined by the setting of handle 101.

The fluid pressure conduits of the trailer portion of the vehicle are connected to tractor portion by a hose coupling 115 interposed in conduit 10 (see FIG. 1). Should the trailer become uncoupled either intentionally or unintentionally from the tractor, it is obvious that control chamber 64 of the control portion 59 of the trailer control valve device 11 would be vented to atmosphere. As will later be described in detail, venting of control chamber 64 causes the trailer brakes to be automatically applied whereas charging of said control chamber with fluid pressure causes the trailer brakes to be released. Thus, in the event that the trailer has been uncoupled so that the brakes thereon are applied and it is desired to release said brakes to move the trailer without making the connection at 115, the handle 101 of the regulator portion 60 is operated to its "Brake Release" position, the cam 100 acting in said position to cause the compression of spring 96 to be sufficiently relaxed to render the combined forces of fluid pressure and the light spring 99 acting on the upper side of piston 88 effective for moving said piston and valve seat member downwardly until valve seat 104 unseats from pilot valve 106. With valve seat 104 unseated from valve 106, fluid under pressure in conduit 14, which effects brake application on the trailer, may escape through delivery chamber 90, opening 92 in separating wall 89, past said unseated valve seat, through passageway 105, through atmospheric chamber 98 and out a vent port 116 formed in casing 87.

If it is desired to reset the brake after the trailer has been moved, it is only necessary to reset the handle 101 in one of its brake applying positions, whereupon the increased compression of spring 96 will result, as above described, to restore fluid pressure in conduit 14.

The pressure limiting valve device 15 (see FIG. 5) is a self-lapping type valve device comprising a casing 117 having disposed therein at one end a valve operating piston 118 subjected on one side to pressure of fluid prevailing in an inlet chamber 119 connected to conduit 18 from auxiliary reservoir 13 via a connection 120 formed in said casing and having opening thereinto a passageway 121 formed in said casing. The other side of piston 118 communicates with a passageway 122 formed in casing 117. A solenoid device 123 of the commonly known variety is associated with the pressure limiting valve device 15 and serves, when energized, to move a valve 124 from a normally seated position on a valve seat 125, to which seated position said valve is biased by means not shown, when said solenoid is deenergized, and in which communication between passageways 121 and 122, and therefore between inlet chamber 119 and the lower side of piston 118, is cut off to a position unseated from said valve seat, in which unseated position said communication is established.

The valve operating piston 118 has associated therewith a valve seat portion 126 having a central opening 127 by which the inlet chamber 119 may be placed in communication with a delivery chamber 128 connected to conduit 16 via a connection 129 formed in casing 117. Opening 127 is provided at the end adjacent inlet chamber 119 with an encircling valve seat 130 on which a supply valve 131 normally occupies a seated position, due to biasing action of a spring 132, in which seated position communication between inlet chamber 119 and delivery chamber 128 is cut off. An exhaust valve 133 is coaxially and rigidly connected to supply valve 131 by a stem 134 for movement as a unit.

A control piston 135, operably disposed in the end of casing 117 adjacent piston 118, is provided with a central opening 136 through which delivery chamber 128 is normally in communication with a control chamber 137 connected to conduit 14 via a connection 138 formed in said casing. Opening 136 has an encircling valve seat 139 at one end on which exhaust valve 133 is operable to a seated position in which communication between delivery chamber 128 and control chamber 137 is interrupted, said communication being established when said exhaust valve occupies a position unseated from said valve seat. Control piston 135 is biased toward normal position by a spring 140, the compression of which may be adjusted by an adjusting screw 141 extending exteriorly of casing 117, said normal position being defined by abutment of said piston with an internal shoulder 142 formed in said casing.

The solenoid device 123 associated with the pressure limiting valve device 15 has two terminals 143 and 144 by which the energizing circuit is connected to the coil (not shown) of said solenoid device. One end of an electrical wire 145 is connected to terminal 143, while the other end is connected to a terminal 146 of a switch arm 147 located in the manually operable valve device 7, said switch arm being operably connected to plunger 19a in suitable manner not shown. One end of a ground wire 148 is connected to the terminal 144, the other end being grounded at 149. Electrical adapters 150 and 151 are interposed in wires 145 and 148, respectively, to facilitate disconnection of the electrical circuits when the trailer is uncoupled from the tractor. A battery 152, which provides electrical energy for the solenoid device 123, is grounded on the return side at 153 by a wire 154 while the output side is connected by a wire 155 to a contact terminal 156 with which switch arm 147 is adapted to make contact when foot pedal 19 is depressed. Contact of switch arm 147 with contact terminal 156 closes the circuit for energizing the solenoid device 123, said circuit comprising, in addition to said solenoid device, the grounds 149 and 153, wire 148 and 145, switch arm 147, wire 155, battery 152 and wire 154.

OPERATION, FIGS. 1, 3, 4 AND 5

In considering the operation of the brake apparatus just described and embodying the invention, it may be assumed that main reservoir 3 is charged with fluid at a prescribed pressure adequate for operating the apparatus. It may also be assumed that auxiliary reservoir 13 is charged with fluid under pressure from main reservoir 3 by way of conduit 6, inlet chamber 43 (see FIG. 3) of the trailer brake valve device 5, past the unseated supply valve 42, delivery chamber 39, conduit 10, control chamber 64 (see FIG. 4) of the trailer control valve device 11, past valve 86, through pressure chamber 72 and conduit 12. Since there are no restrictions in the charging circuit just traced, auxiliary reservoir 13 is charged with fluid at a pressure corresponding to that of main reservoir 3. It may be further assumed that the vehicle brakes are in a release condition in which all parts of the various devices of the brake apparatus are in the respective positions in which they are shown in the drawing.

When the operator of the tractor-trailer vehicle desires to effect a brake application, he depresses foot pedal 19 of the manually operable valve device 7. Depression of foot pedal 19, and, therefore, of plunger 19a causes sequential closing of switch arm 147 on contact terminal 156 first, thereby closing the circuit for energizing solenoid device 123, as above noted, and then establishment of supply communication 22 in the valve device 7.

Energization of solenoid 123 causes valve 124 to unseat from valve seat 125, whereupon, as above noted, fluid pressure in inlet chamber 119 from auxiliary reservoir 13 may flow through passageways 122 and 121 to the lower side of valve operating piston 118 to cause upward movement thereof and thereby seating of exhaust valve 133 and unseating of supply valve 131. With supply valve 131 unseated, fluid under pressure may then flow from inlet chamber 119, past said unseated supply valve, through delivery chamber 128 and through conduit 16 to the trailer brake cylinders 1 and 2 to effect a preliminary brake application on the trailer portion of the vehicle ahead of a full application on the entire vehicle. The degree of the preliminary brake application on the trailer is determined by the compression adjustment of spring 140 by adjusting screw 141.

As fluid under pressure is delivered to conduit 16 and the trailer brake cylinders 1 and 2, the pressure of said fluid builds up in delivery chamber 128 and, therefore, on the adjacent side of control piston 135, which buildup, if given sufficient time, would continue until the resistance of spring 140 is overcome and said piston is moved upwardly to a lap position in which supply valve 131 is reseated on valve seat 130, to cut off further supply of fluid under pressure to conduit 16, while exhaust valve 133 remains in its seated position on valve seat 139, said valves remaining in said relative positions as long as the effective forces acting on opposite sides of the control piston 135 remain in a state of equilibrium. Should the pressure of fluid in delivery chamber 128 be reduced, however, for any reason, such as leakage for example, the forces acting on the upper side of control piston 135 will again become effective for moving said control piston downwardly to unseat supply valve 131 until fluid pressure in delivery chamber again builds up sufficiently to restore said control piston to its lap position. In the manner just described, self-lapping action is obtained in the pressure limiting valve device 15.

When the solenoid device 123 is energized, as immediately above described, for effecting a preliminary brake application on the trailer portion of the vehicle, the interval of time lapsed between the closing of switch arm 147 and the establishment of supply communication 22 normally would not be sufficient to permit self-lapping action of the pressure limiting valve device 15 during the preliminary braking phase. The self-lapping action of the pressure limiting valve device 15 may come into play, however, during the full braking phase of operation following the preliminary braking phase and also during operation of a modified version of the invention to be hereinafter described.

Upon establishment of supply communication 22 by the manually operable valve device 7 immediately following energization of solenoid device 123 and preliminary braking of the trailer, fluid under pressure flows concurrently to the brake cylinder devices (not shown) of the tractor via conduit 23, which effects a brake application on said tractor, and to control chamber 24 of the trailer brake valve device 5, which effects a concurrent brake application on the trailer, both applications being commensurate with the amount of depression of the foot pedal 19.

Action of fluid pressure in control chamber 24 of the trailer brake valve device 5 causes upward movement of piston 27 to effect venting of delivery chamber 39 and conduit 10 to the extent determined by the degree of fluid pressure acting in chamber 24 on piston 27, the control piston 50 acting to terminate venting of said delivery chamber accordingly, as above described. Since conduit 10 is connected to control chamber 64 of the control portion 59 of the trailer control valve device 11, the pressure of fluid in said control chamber is reduced accordingly.

With the reduction of fluid pressure in control chamber 64 of the control portion 59, said control portion operates, as above described, to first seat valve seat 82 on supply-exhaust valve 79 and then unseat said supply-exhaust valve from valve seat 71, whereby fluid under pressure from auxiliary reservoir 13 is delivered to conduit 14, at a controlled and regulated pressure by action of the control portion 59 and the regulator portion 60, in the manner above described.

Fluid at a controlled pressure flows through conduit 14 to control chamber 137 of the pressure limiting valve device 15, which, as above noted, has already been actuated to deliver limited operating fluid pressure to the trailer brake cylinder devices 1 and 2 as determined by the compression setting of spring 140 acting on control piston 135. Therefore, the pressure of fluid delivered via conduit 14 to control chamber 137 combines with the compression of spring 140 to act on the upper side of control piston 135, thereby necessitating a greater build-up of fluid pressure in delivery chamber 128 before said pressure in said delivery chamber is effective for moving said control piston upwardly to its lap position, that is, the position in which fluid pressure supply to the brake cylinders 1 and 2 is terminated.

It should be apparent, therefore, that, when fluid at a controlled pressure is introduced into control chamber 137 of the pressure limiting valve device 15, depending on the degree of said pressure, the braking effect by the brake cylinders 1 and 2 is increased correspondingly over that which occurs during the preliminary phase of trailer braking. It should also be apparent from the above description that the brake apparatus therein described and embodying the invention is capable, during normal braking operations of the tractor-trailer vehicle, of effecting a preliminary and comparatively light braking action on the trailer portion of the vehicle before the full braking action becomes effective concurrently on both the tractor and trailer portions of the vehicle.

DESCRIPTION AND OPERATION, FIG. 2

If desired, the brake apparatus above described may be modified by adding thereto an engine brake, such as partially shown in FIG. 2, for use when it is desired to effect a comparatively light retarding action on the tractor-trailer vehicle as when traveling down a relatively long and slight grade.

The engine brake as shown in FIG. 2 comprises a throttle actuating cylinder 157 which, when supplied with fluid under pressure from a source such as a storage reservoir 158, acts to throttle down the engine, whereby the engine compression serves as a retarding effect on the vehicle, and, when relieved of said fluid pressure, restores throttling action of the engine. An engine brake operating valve device 159 of the two-position type is provided with an operating plunger 160, which in a normal position establishes a release communication 161 (indicated by a solid line in the drawing) in which the actuating cylinder 157 is relieved of fluid pressure, and which, when manually depressed to a supply position, establishes a supply communication 162 (indicated by a broken line in the drawing) in which said actuating piston is supplied with operating fluid pressure from reservoir 158.

The plunger 160 is also operatively connected to an electrical switch arm 163 which is connected by a branch wire 164 to wire 145 leading to solenoid device 123 and which occupies an open position relative to a contact 165 when said plunger is in its normal position, said contact being connected by a branch wire 166 to wire 153 on the output side of battery 152. When plunger 160 is manually depressed downwardly, as viewed in the drawing, toward its supply position, said downward movement sequentially closes switch arm 163 first and then establishes supply communication 162. Closing of switch arm 163 before supply communication 162 is established closes the circuit for energizing the solenoid valve device 123, whereby, in a manner similar to that described in connection with the apparatus as shown in FIG. 1, a light braking effect is obtained on the trailer portion of the vehicle ahead of the braking effect imposed on the tractor by the engine brake.

It should be understood that when the engine brake, as immediately above described, is actuated exclusively of the remainder of the brake apparatus, the respective braking effects on both the tractor and trailer portions of the vehicle will be uniform in magnitude at each application, since the pressure of fluid as supplied respectively to the actuating cylinder 157 and the brake cylinders 1 and 2 is never varied.

Having now described the invention, what I claim as new and desire to secure by Letters Patent, is:

1. A brake control apparatus for use on a highway vehicle of the type comprising a tractor portion and a trailer portion, each being equipped with respective brake applying means responsive to fluid pressure for effecting a brake application and to relief of such pressure for releasing the brake application, said brake control apparatus comprising, in combination, operator's control means having a foot pedal mounted on the tractor for controlling the operation of both the respective brake applying means on the tractor and on the trailer, graduating valve means associated with and operable by said operator's control means for effecting supply of fluid under pressure to the tractor brake applying means at a pressure corresponding to the amount of movement of said foot pedal, trailer-mounted valve means operably responsive to initial movement of said foot-pedal of the operator's control means for effecting supply of fluid therethrough at a uniform limited pressure to the trailer brake applying means, said operator's control means being operative, upon said initial movement of said foot pedal, to cause operation of said trailer-mounted valve means prior to operation of said graduating valve means whereby to cause the trailer brake applying means to be operated in advance of the tractor brake applying means, and trailer brake control valve means operable responsively to operation of said graduating valve means for effecting supply of fluid to said trailer-mounted valve means at a pressure corresponding to that of fluid supplied concurrently to the tractor brake applying means, said trailer-mounted valve means being operable responsively to the accumulative pressure of said fluid under pressure supplied thereto by said trailer brake control valve means and of said fluid at said uniform limited pressure supplied therethrough to the trailer brake applying means under the control of said operator's control means, for effecting supply of fluid to the trailer brake applying means at the same time that fluid under pressure is supplied to the tractor brake applying means and at a pressure exceeding that of fluid supplied to the tractor brake applying means to the extent of said uniform limited pressure.

2. A brake control apparatus for use on a highway vehicle of the type comprising a tractor portion and a trailer portion, each being equipped with respective brake applying means responsive to fluid pressure for effecting a brake application and to relief of such pressure for releasing the brake application, said brake control apparatus comprising, in combination, operator's control means having a foot pedal mounted on the tractor for controlling the operation of both the respective brake applying means on the tractor and on the trailer, graduating valve means associated with and operable by said operator's control means for effecting supply of fluid under pressure to the tractor brake applying means at a pressure corresponding to the amount of movement of said foot pedal, electrical switch means associated with said operator's control means and operable by initial movement of said foot pedal, electro-responsive valve means mounted on the trailer, electrical circuitry connecting said electrical switch means and said electro-responsive valve means, said electro-responsive valve means being operable responsively to electrical energization thereof, upon operation of said switch means to a closed position by said initial movement of said foot pedal, for effecting supply of fluid therethrough at a uniform limited pressure to the trailer brake applying means, said operator's control means being operative, upon said initial movement of said foot pedal, to cause operation of said electro-responsive valve means prior to operation of said graduating valve means whereby to cause the trailer brake applying means to be operated in advance of the tractor brake applying means, and trailer brake control valve means operable responsively to operation of said graduating valve means for effecting supply of fluid to said electro-responsive valve means at a pressure corresponding to that of fluid supplied concurrently to the tractor brake applying means, said electro-responsive valve means being operable responsively to the accumulative pressure of said fluid under pressure supplied thereto by said trailer brake control valve means and of said fluid at said uniform limited pressure supplied therethrough to the trailer brake applying means when electrically energized, for effecting supply of fluid to the trailer brake applying means at the same time that fluid under pressure is supplied to the tractor brake applying means and at a pressure exceeding that of fluid supplied to the tractor brake applying means to the extent of said uniform limited pressure.

3. A brake control apparatus as defined in claim 1, characterized by a first source of fluid under pressure mounted on the tractor for supplying the operating fluid pressure for the tractor brake applying means, a second source of fluid under pressure mounted on the trailer for supplying the operating fluid pressure for the trailer brake applying means, and further characterized in that said trailer brake control valve means includes a control chamber normally charged with fluid pressure from said first source, said trailer brake control valve means being operable responsively to reduction of fluid pressure in said control chamber, effected by operation of said graduating valve means, for effecting supply of operating fluid pressure from said second source to the trailer brake applying means.

4. A brake control apparatus as defined in claim 1, characterized by a first source of fluid under pressure mounted on the tractor for supplying the operating fluid pressure for the tractor brake applying means, a second souce of fluid under pressure mounted on the trailer for supplying the operating fluid pressure for the trailer brake applying means, and wherein the trailer brake control valve means comprises a trailer control valve device mounted on the trailer and having therein a control chamber normally charged with fluid from said first source at a predetermined pressure, a trailer brake valve device mounted on the tractor and operable, responsively, to operation of said graduating valve means, to one position in which supply of fluid under pressure from said first source to said control chamber is effected and to a different position in which a reduction of fluid pressure in said control chamber is effected, said trailer control valve device being operably responsive to said reduction of fluid pressure in said control chamber for effecting supply of operating fluid pressure from said second source to the trailer brake applying means, and conduit means connecting said trailer brake valve device to said trailer control valve device and through which supply of fluid under pressure to and reduction of fluid pressure in said control chamber is effected by said trailer brake valve device, said conduit means including uncoupling means between the tractor and the trailer whereby, upon severance of said uncoupling means, either intentionally or otherwise, a brake application on the trailer is automatically effected.

5. A brake control apparatus for use on a highway vehicle of the type comprising a tractor portion and a trailer portion, each portion being equipped with respective brake applying means responsive to fluid pressure for effecting a brake application and to relief of such pressure for releasing the brake application, said brake control apparatus comprising, in combination, throttle control means mounted on the tractor and operable independently of the tractor brake applying means for effecting and releasing a retarding effect on the tractor by reduction and increase, respectively, of propulsion power, manually operable control means having one position in which the retarding effect on the tractor is released by causing operation of said throttle control means to effect an increase in propulsion power and being operable to a different position for effecting operation of said throttle control means to effect a reduction in propulsion power and thereby cause application of said retarding effect on the tractor, and valve means mounted on the trailer and actuable under control of said manually operable control means for effecting supply of fluid under pressure to the trailer brake applying means, said manually operable control means being operative to cause operation of said valve means on the trailer prior to said operation of said throttle control means on the tractor whereby to cause the trailer brake applying means to be operated in advance of said throttle control means.

6. A brake control apparatus for use on a highway vehicle of the type comprising a tractor portion and a trailer portion, each being equipped with respective brake applying means responsive to fluid pressure for effecting a brake application and to relief of such pressure for releasing the brake application, said brake control apparatus comprising, in combination, a single operator's control means mounted on the tractor for controlling the operation of the respective brake applying means on the tractor and on the trailer, graduating valve means associated with and operable by said operator's control means for effecting supply of fluid under pressure to the tractor brake applying means, and valve means mounted on the trailer and actuable under control of said operator's control means for effecting supply of fluid at a chosen limited pressure to the trailer brake applying means, said operator's control means being operative to cause operation of said valve means on the trailer prior to operation of said graduating valve means whereby to cause the trailer brake applying means to be operated in advance of the tractor brake applying means, throttle control means mounted on the tractor and operable independently of the tractor brake applying means for effecting and releasing a retarding effect on the tractor by causing reduction and increase, respectively, of propulsion force acting on the tractor, and manually operable control means having one position in which said throttle control means is caused to effect an increase in propulsion power whereby the retarding effect on the tractor is released and being operable to a different position for effecting operation of said throttle control means to effect a decrease in propulsion power to cause application of said retarding effect on the tractor, said manually operable control means being operative to cause operation of said valve means mounted on the trailer to effect supply of fluid at a certain limited pressure to the trailer brake applying means in advance of operation of said manually operable control means to its said different position.

7. A brake control apparatus as defined in claim 6 wherein said throttle control means comprises a source of fluid under pressure and an actuating cylinder device adapted to effect reduction of fuel supply to and therefore propulsion power from the driving engine on the tractor, said actuating cylinder device being operably responsive to fluid pressure from said source, as effected by said manually operable control means in its said different position, for effecting reduction of fuel supply to the tractor engine and being operatively responsive to relief of such fluid pressure, as effected by said manually operable control means in its said one position, for terminating said reduction of fuel supply to the tractor engine.

8. A brake control apparatus for use on a highway vehicle of the type comprising a tractor portion and a trailer portion, each of said portions being equipped with respective brake applying means responsive to fluid pressure for effecting a brake application and to relief of such pressure for releasing the brake application, said brake control apparatus comprising, in combination, a first source of fluid under pressure, a pressure limiting valve device having a contol chamber, said pressure limiting valve device being operable, in response to an actuating impulse and when said control chamber is void of fluid pressure, for effecting delivery of fluid from said first source to the trailer brake-applying means at a certain limited pressure and being operable, when said control chamber is charged with fluid pressure, for effecting delivery of fluid from said first source to the trailer brake-applying means at a pressure higher than and accumulative with said certain limited pressure according to the degree of charge in said control chamber, a control valve device operative responsively to reduction of fluid pressure in a control chamber therein, normally charged with fluid at a predetermined degree, for effecting delivery of fluid from said first source to said control chamber of said pressure limiting valve device at a pressure commensurate with the degree of said reduction, said control valve device being operable, upon restoration of fluid pressure in the control chamber of the control valve device to said predetermined degree, for effecting discharge of fluid pressure from said control chamber of said pressure limiting valve device, a second source of fluid under pressure, a trailer brake valve device including self-lapping valve means having one position, in which a supply communication is open for supplying fluid pressure from said second source to said control chamber of said control valve device, and being operable responsively to controlled fluid pressure to a different position in which said supply communication is cut off and a fluid pressure reduction communication connected to said control chamber of said control valve device is established for effecting reduction of fluid pressure in the last-mentioned control chamber an amount corresponding to the degree of controlled fluid pressure operating said self-lapping valve means to its said different position, an operator-controlled valve device including an operating plunger and graduating valve means operable by movement of said plunger for effecting delivery of fluid from said second source to said trailer brake valve device at a controlled pressure corresponding to the amount of movement of said plunger, and means interconnected between said pressure limiting valve device and said operator-controlled valve device operable by movement of said plunger sequentially in advance of said graduating valve means for effecting said actuating impulse of said pressure limiting valve device in advance of the charging of the control chamber of said pressure limiting valve device.

9. Brake control apparatus as defined in claim 3 in which the valve means on the trailer portion is also operative responsively to the supply of operating fluid pressure thereto effected by the trailer brake control valve means to supply fluid under pressure from said second source to the trailer brake applying means in excess of the chosen limited pressure.

10. Brake control apparatus as defined in claim 3, in which the valve means on the trailer comprises a pair of coaxially arranged connected valves, one of which seats on a seat member to close a communication via which fluid under pressure is supplied from the said second source to the trailer brake applying means, the other of which is adapted to seat on a corresponding valve seat formed on a piston member subject in opposing relation to the force of a spring and the pressure of the fluid in a chamber corresponding to that delivered to the trailer brake applying means, the seat member for said one valve being actuable responsively to operation of said operator's control means to unseat said one valve and seat said other valve, the pressure of the fluid supplied past said one valve to the trailer brake applying means acting on the said piston member to effect reseating of said one valve on its said seat member to cut off supply of fluid under pressure to the trailer brake applying means, at said chosen limited pressure, said piston member being subject to fluid under pressure in a control chamber to which operating fluid pressure is supplied from the trailer brake control valve means following reseating of said one valve at said chosen limited pressure, to unseat said one valve to effect additional supply of fluid under pressure to the trailer brake applying means in proportion to the pressure of fluid supplied to the control chamber of said valve means.

References Cited in the file of this patent
UNITED STATES PATENTS 2,515,946    Cadman _____ July 18, 1950
2,941,844    Stelzer _____ June 21, 1960